United States Patent
Luo et al.

(10) Patent No.: US 10,159,031 B2
(45) Date of Patent: Dec. 18, 2018

(54) ACCESS POINT, STATION, AND BEACON FRAME SENDING METHOD AND SYSTEM

(71) Applicants: Huawei Technologies Co., Ltd., Shenzhen (CN); Broadband Mobile Technologies, Inc., McKinney, TX (US)

(72) Inventors: Jun Luo, Shanghai (CN); Phillip Barber, McKinney, TX (US); Peter Loc, Cupertino, CA (US)

(73) Assignees: Huawei Technologies Co., Ltd., Shenzhen (CN); Broadband Mobile Technologies, Inc., McKinney, TX (US)

( * ) Notice: Subject to any disclaimer, the term of this patent is extended or adjusted under 35 U.S.C. 154(b) by 108 days.

(21) Appl. No.: 15/248,741

(22) Filed: Aug. 26, 2016

(65) Prior Publication Data

US 2016/0366633 A1 Dec. 15, 2016

Related U.S. Application Data

(63) Continuation of application No. PCT/CN2014/085226, filed on Aug. 26, 2014.

(30) Foreign Application Priority Data

Feb. 27, 2014 (CN) .......................... 2014 1 0070321

(51) Int. Cl.
*H04W 4/00* (2018.01)
*H04W 40/04* (2009.01)
(Continued)

(52) U.S. Cl.
CPC ........... *H04W 40/04* (2013.01); *H04L 5/0094* (2013.01); *H04W 48/12* (2013.01); *H04W 72/04* (2013.01); *H04W 84/12* (2013.01); *H04W 88/08* (2013.01)

(58) Field of Classification Search
None
See application file for complete search history.

(56) References Cited

U.S. PATENT DOCUMENTS

| 2005/0063334 A1 | 3/2005 | Fnu et al. |
| 2011/0013608 A1 | 1/2011 | Lee et al. |

(Continued)

FOREIGN PATENT DOCUMENTS

| CN | 1602087 A | 3/2005 |
| CN | 101420280 A | 4/2009 |

(Continued)

OTHER PUBLICATIONS

"IEEE Standard for Information Technology-Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n-2009, Institute of Electrical and Electronics Engineers, New York, New York (Oct. 29, 2009).

(Continued)

*Primary Examiner* — Zewdu A Beyen
(74) *Attorney, Agent, or Firm* — Leydig, Voit & Mayer, Ltd.

(57) ABSTRACT

The present invention discloses an access point, a station, and a beacon frame sending method and system, relates to the communications field, and resolves a problem of relatively large network overheads caused for purposes of ensuring that in a WLAN system having multiple channels, a STA can quickly access a network. A specific solution is as follows: A first sending unit sends a beacon indication frame on each subchannel of N subchannels, where the beacon indication frame is used to indicate configuration information of a beacon frame; and a second sending unit sends the (Continued)

beacon frame on at least one first subchannel. The present invention is applied to a beacon frame sending process.

18 Claims, 7 Drawing Sheets

(51) Int. Cl.
*H04W 48/12* (2009.01)
*H04L 5/00* (2006.01)
*H04W 72/04* (2009.01)
*H04W 84/12* (2009.01)
*H04W 88/08* (2009.01)

(56) References Cited

U.S. PATENT DOCUMENTS

| | | | |
|---|---|---|---|
| 2011/0176467 A1 | 7/2011 | Lampe et al. | |
| 2013/0039200 A1* | 2/2013 | Park | H04W 16/14 370/252 |
| 2013/0177001 A1 | 7/2013 | Abraham et al. | |
| 2013/0230035 A1 | 9/2013 | Grandhi et al. | |
| 2013/0272289 A1 | 10/2013 | Yao et al. | |
| 2014/0010223 A1 | 1/2014 | Wang et al. | |
| 2015/0245282 A1 | 8/2015 | Kim et al. | |

FOREIGN PATENT DOCUMENTS

| | | |
|---|---|---|
| CN | 102006653 A | 4/2011 |
| CN | 102769854 A | 11/2012 |
| CN | 103196421 A | 7/2013 |
| CN | 103428810 A | 12/2013 |
| WO | WO 2014027829 A1 | 2/2014 |

OTHER PUBLICATIONS

"IEEE Standard for Information technology-Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Std 802.11ac-2013, Institute of Electrical and Electronics Engineers, New York, New York (2013).

* cited by examiner

ACCESS POINT, STATION, AND BEACON FRAME SENDING METHOD AND SYSTEM

CROSS-REFERENCE TO RELATED APPLICATIONS

This application is a continuation of International Application No. PCT/CN2014/085226, filed on Aug. 26, 2014, which claims priority to Chinese Patent Application No. 201410070321.9, filed on Feb. 27, 2014, both of which are hereby incorporated by reference in their entireties.

TECHNICAL FIELD

The present invention relates to the communications field, and in particular, to an access point, a station, and a beacon frame sending method and system.

BACKGROUND

With the development of the mobile Internet and popularization of intelligent terminals, an amount of data in a network sharply increases. To efficiently process the data, a wireless local area network (wireless local area network, WLAN) system that has advantages such as a high rate and low costs becomes one of mainstream mobile broadband access technologies.

To further increase a service data transmission rate of the WLAN system, in the Institute of Electrical and Electronics Engineers (Institute of Electrical and Electronics Engineers, IEEE) 802.11n/ac standard, several adjacent channels (for example, a bandwidth of each channel is 20 MHz) are merged into a channel that has a larger bandwidth (for example, 80 MHz or 160 MHz), and then service data transmission is performed by using this channel that has a larger bandwidth. In this way, the service data transmission rate of the WLAN system is exponentially increased. In addition, with the continuous development of the mobile Internet, more unlicensed spectrums are applied to the WLAN system. For example, the Federal Communications Commission (Federal Communications Commission, FCC) will release 195 MHz of 5 GHz spectrums for use in the WLAN system, that is, in the future, a capability of supporting multiple channels by the WLAN system will be further improved. In a WLAN system having multiple channels, because a station (Station, STA) does not know which subchannel among multiple subchannels of the WLAN system is a primary channel (the primary channel includes a beacon frame required for accessing a network by the STA), in order to access the network, the STA needs to perform scanning on the multiple subchannels. To ensure that a STA can fast access a network, in the prior art, an access point (Access Point, AP) needs to send a beacon frame on each available subchannel, so that the STA fast acquires the beacon frame by scanning the subchannel, and further obtains, from the beacon frame, information required for accessing the network, so as to achieve access to the network.

The prior art has at least the following problem: In the prior art, an information length of a beacon frame is large (for example, an information length, specified in the IEEE 802.11b standard, of a beacon frame is approximately 160 bytes); in this case, in a WLAN system having multiple channels, if an AP sends a beacon frame on all available subchannels in order for a STA to perform scanning and access, large network overheads are brought to the WLAN system.

SUMMARY

An access point, a station, and a beacon frame sending method and system provided in the present invention resolve a problem of relatively large network overheads caused for purposes of ensuring that in a WLAN system having multiple channels, a STA can quickly access a network.

To achieve the foregoing objective, the following technical solutions are used in the present invention:

According to a first aspect of the present invention, an access point AP is provided and is applied to a wireless local area network WLAN system, where the WLAN system includes N subchannels, the N subchannels include A first subchannels, N is a positive integer greater than or equal to 2, A is a positive integer less than N, and the AP includes:

a first sending unit, configured to send a beacon indication frame on each subchannel of the N subchannels, where the beacon indication frame is used to indicate configuration information of a beacon frame; and a second sending unit, configured to send the beacon frame on at least one first subchannel.

With reference to the first aspect, in a possible implementation manner, the beacon indication frame includes a service set identifier SSID of the AP, a channel identifier of each first subchannel on which the beacon frame is sent, and a sending time, at which the beacon frame is sent, corresponding to the channel identifier.

With reference to the first aspect and the foregoing possible implementation manner, in another possible implementation manner, the beacon indication frame further includes a time interval, at which the beacon frame is sent, corresponding to the channel identifier of each first subchannel on which the beacon frame is sent.

With reference to the first aspect and the foregoing possible implementation manner, in another possible implementation manner, the beacon indication frame further includes event notification information, where when system information of the WLAN system does not change, the event notification information is used to indicate that the system information of the WLAN system does not change, and when the system information of the WLAN system needs to be changed, the event notification information is used to indicate to-be-changed system information and a remaining time before the to-be-changed system information changes.

With reference to the first aspect and the foregoing possible implementation manner, in another possible implementation manner, when system information of the WLAN system changes, the beacon indication frame further includes event notification information, where the event notification information is used to indicate to-be-changed system information and a remaining time before the to-be-changed system information changes.

With reference to the first aspect and the foregoing possible implementation manners, in another possible implementation manner, the first subchannel is a primary channel.

According to a second aspect of the present invention, a station STA is provided and is applied to a wireless local area network WLAN system, where the WLAN system includes N subchannels, the N subchannels include A first subchannels, N is a positive integer greater than or equal to 2, A is a positive integer less than N, and the STA includes:

a receiving unit, configured to receive, on any sub channel of the N subchannels, a beacon indication frame sent by an access point AP, where the beacon indication frame is used to indicate configuration information of a beacon frame, and the beacon frame is sent by the AP on at least one first subchannel;

an acquiring unit, configured to acquire, according to the beacon indication frame obtained by the receiving unit, access information required for accessing the AP; and an access unit, configured to access the AP according to the access information that is required for accessing the AP and obtained by the acquiring unit.

With reference to the second aspect, in a possible implementation manner, the beacon indication frame includes a service set identifier SSID of the AP, a channel identifier of each first subchannel on which the beacon frame is sent, and a sending time, at which the beacon frame is sent, corresponding to the channel identifier.

With reference to the second aspect and the foregoing possible implementation manner, in another possible implementation manner, when the AP sends the beacon frame on one first subchannel, the acquiring unit includes:

a first determining module, configured to determine a first remaining time according to the sending time, at which the beacon frame is sent, corresponding to the channel identifier of each first subchannel on which the beacon frame is sent, where the first remaining time is a remaining time for sending the beacon frame on the first subchannel on which the beacon frame is sent;

a first starting module, configured to start a timer; and a first receiving module, configured to: when a timing time of the timer is equal to the first remaining time, receive the beacon frame according to the channel identifier of each first subchannel on which the beacon frame is sent, where the beacon frame includes the access information required for accessing the AP.

With reference to the second aspect and the foregoing possible implementation manner, in another possible implementation manner, when the AP sends the beacon frame on two or more first subchannels, the acquiring unit includes:

a second determining module, configured to determine a first channel identifier, where the first channel identifier is a channel identifier of a first subchannel that is used to receive the beacon frame, where the second determining module is further configured to determine a second remaining time according to a sending time, at which the beacon frame is sent, corresponding to the first channel identifier, where the second remaining time is a remaining time for sending the beacon frame on the first subchannel corresponding to the first channel identifier;

a second starting module, configured to start a timer; and a second receiving module, configured to: when a timing time of the timer is equal to the second remaining time, receive the beacon frame according to the first channel identifier, where the beacon frame includes the access information required for accessing the AP.

With reference to the second aspect and the foregoing possible implementation manner, in another possible implementation manner, the second determining module is specifically configured to:

determine, according to the beacon indication frame, a channel identifier corresponding to a sending time that is the earliest in sending times for sending the beacon frame, as the first channel identifier; or determine, according to a radio frequency capability of a receiver of the STA, a channel identifier of a first subchannel supported by the STA, as the first channel identifier.

With reference to the second aspect and the foregoing possible implementation manner, in another possible implementation manner, the acquiring unit includes:

a sending module, configured to send a probe request frame to the AP according to the beacon indication frame; and a third receiving module, configured to receive a probe response frame sent by the AP, where the probe response frame includes the access information required for accessing the AP.

With reference to the second aspect and the foregoing possible implementation manner, in another possible implementation manner, the receiving unit is further configured to receive the beacon indication frame on the subchannel after the access unit accesses the AP according to the access information required for accessing the AP, where the beacon indication frame further includes event notification information; and when the event notification information is used to indicate that system information of the WLAN system does not change, receive the beacon frame according to the beacon indication frame.

With reference to the second aspect and the foregoing possible implementation manner, in another possible implementation manner, the STA further includes:

a starting unit, configured to start a timer when the event notification information is used to indicate to-be-changed system information and a remaining time before the to-be-changed system information changes, where the receiving unit is further configured to: when a timing time of the timer is equal to the remaining time before the to-be-changed system information changes, receive a new beacon indication frame on the subchannel; and the acquiring unit is further configured to acquire a new beacon frame according to the new beacon indication frame obtained by the receiving unit; and an updating unit, configured to update the to-be-changed system information according to the new beacon frame obtained by the acquiring unit.

With reference to the second aspect and the foregoing possible implementation manner, in another possible implementation manner, the receiving unit is further configured to receive the beacon indication frame on the subchannel after the access unit accesses the AP according to the access information required for accessing the AP;

the starting unit is further configured to start a timer when the beacon indication frame obtained by the receiving unit includes event notification information, where the event notification information is used to indicate to-be-changed system information and a remaining time before the to-be-changed system information changes;

the receiving unit is further configured to: when a timing time of the timer is equal to the remaining time before the to-be-changed system information changes, receive a new beacon indication frame on the subchannel;

the acquiring unit is further configured to acquire a new beacon frame according to the new beacon indication frame obtained by the receiving unit; and the updating unit is further configured to update the to-be-changed system information according to the new beacon frame obtained by the acquiring unit.

With reference to the second aspect and the foregoing possible implementation manners, in another possible implementation manner, the STA further includes:

a processing unit, configured to enter a sleep state before the first starting module or the second starting module starts the timer.

With reference to the second aspect and the foregoing possible implementation manners, in another possible implementation manner, the processing unit is further configured to enter a sleep state before the starting unit starts the timer.

With reference to the second aspect and the foregoing possible implementation manners, in another possible implementation manner, the receiving unit is specifically configured to receive the beacon indication frame on a subchannel that is accessed or on any subchannel of the N subchannels.

With reference to the second aspect and the foregoing possible implementation manners, in another possible implementation manner, the first subchannel is a primary channel.

According to a third aspect of the present invention, a beacon frame sending method is provided and is applied to a wireless local area network WLAN system, where the WLAN system includes N subchannels, the N subchannels include A first subchannels, N is a positive integer greater than or equal to 2, A is a positive integer less than N, and the method includes:

sending, by an access point AP, a beacon indication frame on each subchannel of the N subchannels, where the beacon indication frame is used to indicate configuration information of a beacon frame; and sending the beacon frame on at least one first subchannel.

With reference to the third aspect, in a possible implementation manner, the beacon indication frame includes a service set identifier SSID of the AP, a channel identifier of each first subchannel on which the beacon frame is sent, and a sending time, at which the beacon frame is sent, corresponding to the channel identifier.

With reference to the third aspect and the foregoing possible implementation manner, in another possible implementation manner, the beacon indication frame further includes a time interval, at which the beacon frame is sent, corresponding to the channel identifier of each first subchannel on which the beacon frame is sent.

With reference to the third aspect and the foregoing possible implementation manner, in another possible implementation manner, the beacon indication frame further includes event notification information, where when system information of the WLAN system does not change, the event notification information is used to indicate that the system information of the WLAN system does not change, and when the system information of the WLAN system needs to be changed, the event notification information is used to indicate to-be-changed system information and a remaining time before the to-be-changed system information changes.

With reference to the third aspect and the foregoing possible implementation manner, in another possible implementation manner, when system information of the WLAN system changes, the beacon indication frame further includes event notification information, where the event notification information is used to indicate to-be-changed system information and a remaining time before the to-be-changed system information changes.

With reference to the third aspect and the foregoing possible implementation manners, in another possible implementation manner, the first subchannel is a primary channel.

According to a fourth aspect of the present invention, a beacon frame sending method is provided and is applied to a wireless local area network WLAN system, where the WLAN system includes N subchannels, the N subchannels include A first subchannels, N is a positive integer greater than or equal to 2, A is a positive integer less than N, and the method includes:

receiving, by a station STA on any subchannel of the N subchannels, a beacon indication frame sent by an access point AP, where the beacon indication frame is used to indicate configuration information of a beacon frame, and the beacon frame is sent by the AP on at least one first subchannel;

acquiring, according to the beacon indication frame, access information required for accessing the AP; and accessing the AP according to the access information required for accessing the AP.

With reference to the fourth aspect, in a possible implementation manner, the beacon indication frame includes a service set identifier SSID of the AP, a channel identifier of each first subchannel on which the beacon frame is sent, and a sending time, at which the beacon frame is sent, corresponding to the channel identifier.

With reference to the fourth aspect and the foregoing possible implementation manner, in another possible implementation manner, when the AP sends the beacon frame on one first subchannel, the acquiring, according to the beacon indication frame, access information required for accessing the AP includes:

determining a first remaining time according to the sending time, at which the beacon frame is sent, corresponding to the channel identifier of each first subchannel on which the beacon frame is sent, where the first remaining time is a remaining time for sending the beacon frame on the first subchannel on which the beacon frame is sent;

starting a timer; and when a timing time of the timer is equal to the first remaining time, receiving the beacon frame according to the channel identifier of each first subchannel on which the beacon frame is sent, where the beacon frame includes the access information required for accessing the AP.

With reference to the fourth aspect and the foregoing possible implementation manner, in another possible implementation manner, when the AP sends the beacon frame on two or more first subchannels, the acquiring, according to the beacon indication frame, access information required for accessing the AP includes:

determining a first channel identifier, where the first channel identifier is a channel identifier of a first subchannel that is used to receive the beacon frame;

determining a second remaining time according to a sending time, at which the beacon frame is sent, corresponding to the first channel identifier, where the second remaining time is a remaining time for sending the beacon frame on the first subchannel corresponding to the first channel identifier;

starting a timer; and when a timing time of the timer is equal to the second remaining time, receiving the beacon frame according to the first channel identifier, where the beacon frame includes the access information required for accessing the AP.

With reference to the fourth aspect and the foregoing possible implementation manner, in another possible implementation manner, the determining a first channel identifier includes:

determining, according to the beacon indication frame, a channel identifier corresponding to a sending time that is the earliest in sending times for sending the beacon frame, as the first channel identifier; or determining, according to a radio frequency capability of a receiver of the STA, a channel identifier of a first subchannel supported by the STA, as the first channel identifier.

With reference to the fourth aspect and the foregoing possible implementation manner, in another possible implementation manner, the acquiring, according to the beacon indication frame, access information required for accessing the AP includes:

sending a probe request frame to the AP according to the beacon indication frame; and receiving a probe response frame sent by the AP, where the probe response frame includes the access information required for accessing the AP.

With reference to the fourth aspect and the foregoing possible implementation manner, in another possible implementation manner, after the accessing the AP according to the access information required for accessing the AP, the method further includes:

receiving the beacon indication frame on the subchannel, where the beacon indication frame further includes event notification information; and when the event notification information is used to indicate that system information of the WLAN system does not change, receiving the beacon frame according to the beacon indication frame.

With reference to the fourth aspect and the foregoing possible implementation manner, in another possible implementation manner, the method further includes:

starting a timer when the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

With reference to the fourth aspect and the foregoing possible implementation manner, in another possible implementation manner, after the accessing the AP according to the access information required for accessing the AP, the method further includes:

receiving the beacon indication frame on the subchannel;

starting a timer when the beacon indication frame includes event notification information, where the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

With reference to the fourth aspect and the foregoing possible implementation manners, in another possible implementation manner, before the starting a timer, the method further includes:

entering a sleep state.

With reference to the fourth aspect and the foregoing possible implementation manners, in another possible implementation manner, the receiving the beacon indication frame on the subchannel includes:

receiving the beacon indication frame on a subchannel that is accessed or on any subchannel of the N subchannels.

With reference to the fourth aspect and the foregoing possible implementation manners, in another possible implementation manner, the first subchannel is a primary channel.

According to a fifth aspect of the present invention, a beacon frame sending system is provided and is applied to a wireless local area network WLAN system, where the WLAN system includes N subchannels, the N subchannels include A first subchannels, N is a positive integer greater than or equal to 2, A is a positive integer less than N, and the beacon frame sending system includes an access point AP and a station STA, where the AP is configured to: send a beacon indication frame on each subchannel of the N subchannels, where the beacon indication frame is used to indicate configuration information of a beacon frame; and send the beacon frame on at least one first subchannel; and the STA is configured to: receive, on any subchannel of the N subchannels, the beacon indication frame sent by the access point AP; acquire, according to the beacon indication frame, access information required for accessing the AP; and access the AP according to the access information required for accessing the AP.

According to the access point, the station, and the beacon frame sending method and system provided in the present invention, in a WLAN system having multiple channels, an AP sends a beacon frame only on at least one first subchannel, and sends, on each subchannel of the multiple channels, a beacon indication frame to indicate configuration information of the beacon frame, which reduces network overheads on a premise of ensuring that a STA fast accesses a network.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

Figure 1:
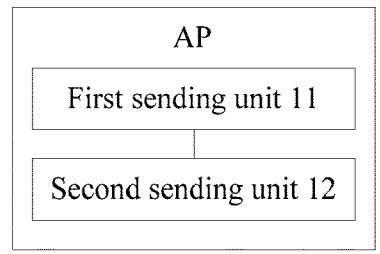
FIG. 1 is a schematic composition diagram of an AP according to Embodiment 1 of the present invention.

Embodiment 1 of the present invention provides an AP, applied to a WLAN system, where the WLAN system includes N subchannels, the N subchannels include A first subchannels, N is a positive integer greater than or equal to 2, and A is a positive integer less than N. As shown in FIG. 1, the AP includes a first sending unit 11 and a second sending unit 12.

The first sending unit 11 is configured to send a beacon indication frame on each subchannel of the N subchannels, where the beacon indication frame is used to indicate configuration information of a beacon frame.

The second sending unit 12 is configured to send the beacon frame on at least one first subchannel.

In the WLAN system having N subchannels (where the N subchannels include A first subchannels), to reduce network overheads on a premise of ensuring that a STA fast accesses a network, the first sending unit 11 of the AP sends, on each subchannel of the N subchannels included in the WLAN system, a beacon indication frame of which an information length is relatively small and that is used to indicate configuration information of a beacon frame, and the second sending unit 12 of the AP sends, on at least one first subchannel, a beacon frame of which an information length is relatively large.

The first sending unit 11 of the AP may periodically send the beacon indication frame on each subchannel of the N subchannels, and the second sending unit 12 of the AP may also periodically send the beacon frame on each first subchannel of the at least one first sub channel. In addition, to save energy of the STA and ensure that the STA fast accesses the network, a period at which the first sending unit 11 of the AP sends the beacon indication frame is shorter than a period at which the second sending unit 12 of the AP sends the beacon frame.

In this embodiment of the present invention, further, in the beacon indication frame, the following information may be used to indicate the configuration information of the beacon frame, and specifically, the beacon indication frame includes a service set identifier (service set identifier, SSID) of the AP, a channel identifier of each first subchannel on which the beacon frame is sent, and a sending time, at which the beacon frame is sent, corresponding to the channel identifier.

In this embodiment of the present invention, further, to further save the energy of the STA, the beacon indication frame sent by the first sending unit 11 of the AP on the subchannel may further include a time interval, at which the beacon frame is sent, corresponding to the channel identifier of each first subchannel on which the beacon frame is sent. In this way, after acquiring the time interval at which the beacon frame is sent and that is in the beacon indication frame and corresponding to the channel identifier of each first subchannel on which the beacon frame is sent, in a subsequent process of repeatedly receiving the beacon frame sent by the second sending unit 12 of the AP, the STA does not need to be in a listening state all the time, but may switch, at a moment at which the beacon frame is sent and according to the acquired time interval, at which the beacon frame is sent, corresponding to the channel identifier of each first subchannel on which the beacon frame is sent, from a sleep state to a working state to receive the beacon frame sent by the AP.

When system information of the WLAN system changes, the second sending unit 12 of the AP adds to-be-changed system information in the beacon frame to notify the STA. Therefore, to prevent the STA from continuously tracing a network change and from wasting the energy of the STA, the first sending unit 11 of the AP may add event notification information to the sent beacon indication frame. In a possible implementation manner in this embodiment of the present invention, further, the beacon indication frame further includes event notification information, where when system information of the WLAN system does not change, the event notification information is used to indicate that the system information of the WLAN system does not change, and when the system information of the WLAN system needs to be changed, the event notification information is used to indicate to-be-changed system information and a remaining time before the to-be-changed system information changes.

It should be noted that the system information of the WLAN system in this embodiment of the present invention may include but is not limited to one or a combination of the following information: the configuration information of the beacon frame, first subchannels in the N subchannels included in the WLAN system, and second subchannels in the N subchannels included in the WLAN system, where the second subchannels are subchannels, except the first subchannels, in the N subchannels of the WLAN system.

In another possible implementation manner in this embodiment of the present invention, further, when system information of the WLAN system does not change, the beacon indication frame does not carry event notification information; when the system information of the WLAN system needs to be changed, the beacon indication frame further includes the event notification information, where the event notification information is used to indicate to-be-changed system information and a remaining time before the to-be-changed system information changes.

In this embodiment of the present invention, further, the first subchannel is a primary channel.

It should be noted that the STA in this embodiment of the present invention refers to an electronic device having a Wireless Fidelity (Wireless Fidelity, Wi-Fi) function, such as a mobile phone or a terminal. The STA is not specifically limited herein in this embodiment of the present invention.

According to the access point provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame, which reduces network overheads on a premise of ensuring that a STA fast accesses a network.

In addition, when system information of the WLAN system is about to change, the STA is notified in advance by using event notification information, which prevents the STA from continuously tracing a network change, and further saves energy of the STA.

Embodiment 2

Figure 2:
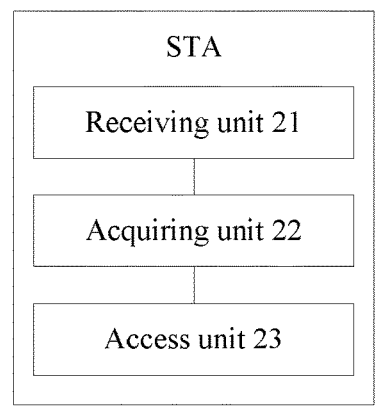
FIG. 2 is a schematic composition diagram of a STA according to Embodiment 2 of the present invention.

Embodiment 2 of the present invention provides a STA, applied to a WLAN system, where the WLAN system includes N subchannels, the N subchannels include A first subchannels, N is a positive integer greater than or equal to 2, and A is a positive integer less than N. As shown in FIG. 2, the STA may include a receiving unit 21, an acquiring unit 22, and an access unit 23.

The receiving unit 21 is configured to receive, on any subchannel of the N subchannels, a beacon indication frame sent by an access point AP, where the beacon indication frame is used to indicate configuration information of a beacon frame, and the beacon frame is sent by the AP on at least one first subchannel.

When the STA needs to access a network, the receiving unit 21 may receive, on any subchannel of the N subchannels included in the WLAN system, a beacon indication frame of which an information length is relatively small and that is sent by the AP and used to indicate configuration information of a beacon frame.

The acquiring unit 22 is configured to acquire, according to the beacon indication frame obtained by the receiving unit 21, access information required for accessing the AP.

The access unit 23 is configured to access the AP according to the access information that is required for accessing the AP and obtained by the acquiring unit 22.

In this embodiment of the present invention, further, the beacon indication frame includes a service set identifier SSID of the AP, a channel identifier of each first subchannel on which the beacon frame is sent, and a sending time, at which the beacon frame is sent, corresponding to the channel identifier.

Figure 3:
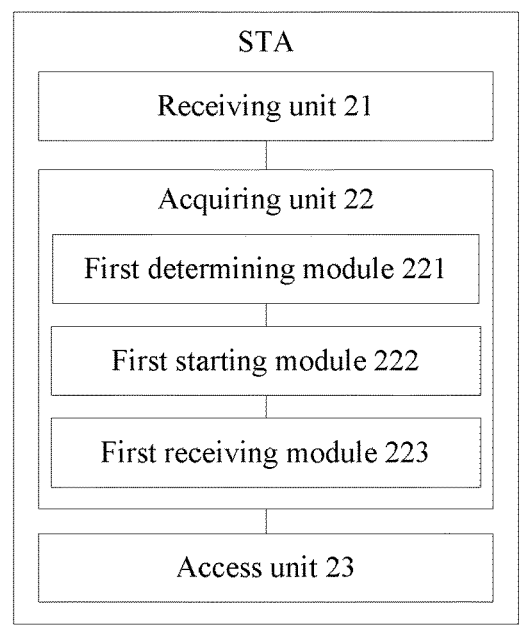
FIG. 3 is a schematic composition diagram of another STA according to Embodiment 2 of the present invention.

In a possible implementation manner in this embodiment of the present invention, further, as shown in FIG. 3, when the AP sends the beacon frame on one first subchannel, the acquiring unit 22 includes a first determining module 221, a first starting module 222, and a first receiving module 223.

The first determining module 221 is configured to determine a first remaining time according to the sending time, at which the beacon frame is sent, corresponding to the channel identifier of each first subchannel on which the beacon frame is sent, where the first remaining time is a remaining time for sending the beacon frame on the first subchannel on which the beacon frame is sent.

Because the beacon indication frame includes the sending time, at which the beacon frame is sent on the first subchannel, corresponding to the channel identifier of each first subchannel on which the beacon frame is sent, the first determining module 221 of the STA needs to determine how much time remains from a moment at which the beacon indication frame is received to a sending time at which the AP sends the beacon frame on the first subchannel, that is, the first determining module 221 of the STA needs to determine the first remaining time, so as to receive the beacon frame at the moment at which the AP sends the beacon frame.

The first starting module 222 is configured to start a timer.

The first receiving module 223 is configured to: when a timing time of the timer is equal to the first remaining time, receive the beacon frame according to the channel identifier of each first subchannel on which the beacon frame is sent, where the beacon frame includes the access information required for accessing the AP.

When the AP sends the beacon frame on one first subchannel, the beacon indication frame includes only one channel identifier of a first subchannel on which the beacon frame is sent and a sending time, at which the beacon frame is sent, corresponding to the channel identifier. Specifically, after starting the timer, when the timing time of the timer is equal to the first remaining time, the first starting module 222 may switch from a sleep state to a working state, and then the first receiving module 223 receives, according to the channel identifier, included in the beacon indication frame, of the first subchannel on which the beacon frame is sent, the beacon frame that includes the access information required for accessing the AP and is sent by the AP on the first subchannel.

Figure 4:
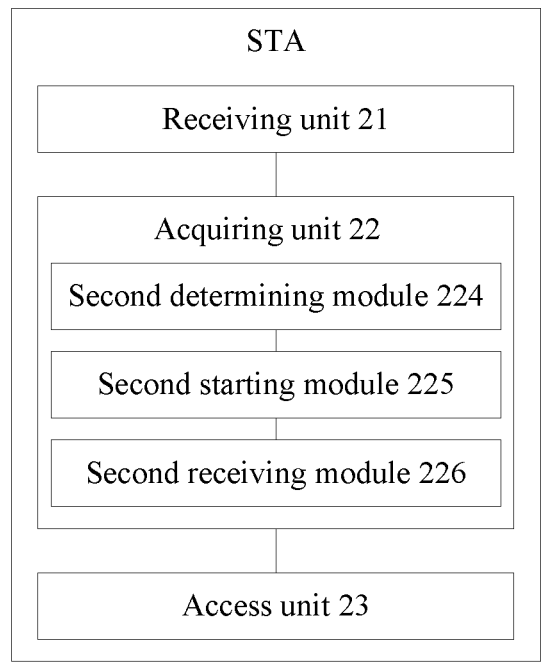
FIG. 4 is a schematic composition diagram of still another STA according to Embodiment 2 of the present invention.

In another possible implementation manner in this embodiment of the present invention, further, as shown in FIG. 4, when the AP sends the beacon frame on two or more first subchannels, the acquiring unit 22 includes a second determining module 224, a second starting module 225, and a second receiving module 226.

The second determining module 224 is configured to determine a first channel identifier, where the first channel identifier is a channel identifier of a first subchannel that is used to receive the beacon frame.

When the AP sends the beacon frame on two or more first subchannels, the beacon indication frame sent by the AP on the subchannel includes a channel identifier of each first subchannel on which the beacon frame is sent and a sending time, at which the beacon frame is sent, corresponding to the channel identifier. In this case, after the receiving unit 21 receives, on any subchannel of the N subchannels, the beacon indication frame sent by the AP, the second determining module 224 first needs to determine a first channel identifier, where the first channel identifier is a channel identifier of a first subchannel that is used to receive the beacon frame.

The second determining module 224 is further configured to determine a second remaining time according to a sending time, at which the beacon frame is sent, corresponding to the first channel identifier, where the second remaining time is a remaining time for sending the beacon frame on the first subchannel corresponding to the first channel identifier.

Because the beacon indication frame includes the sending time, at which the beacon frame is sent on the first subchannel, corresponding to the channel identifier of each first subchannel on which the beacon frame is sent, after determining the first channel identifier of the first subchannel that is used to receive the beacon frame, the second determining module 224 further needs to determine how much time remains from a moment at which the beacon indication frame is received to a sending time at which the AP sends the beacon frame on the first subchannel corresponding to the first channel identifier, that is, the second determining module 224 needs to determine the second remaining time, so as to receive the beacon frame at the moment at which the AP sends the beacon frame on the first subchannel corresponding to the first channel identifier.

The second starting module 225 is configured to start a timer.

The second receiving module 226 is configured to: when a timing time of the timer is equal to the second remaining time, receive the beacon frame according to the first channel identifier, where the beacon frame includes the access information required for accessing the AP.

After starting the timer, when the timing time of the timer is equal to the second remaining time, the second starting module 225 may switch from a sleep state to a working state, and the second receiving module 226 receives, according to the first channel identifier, the beacon frame that includes the access information required for accessing the AP and is sent by the AP on the first subchannel corresponding to the first channel identifier.

In this embodiment of the present invention, further, the second determining module 224 is specifically configured to: determine, according to the beacon indication frame, a channel identifier corresponding to a sending time that is the earliest in sending times for sending the beacon frame, as the first channel identifier; or determine, according to a radio frequency capability of a receiver of the STA, a channel identifier of a first subchannel supported by the STA, as the first channel identifier.

Figure 5:
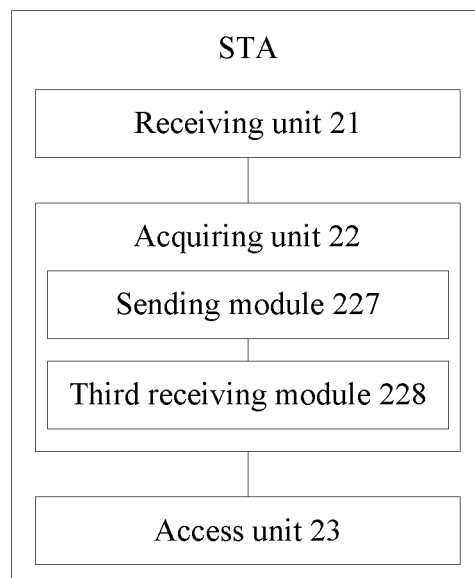
FIG. 5 is a schematic composition diagram of yet another STA according to Embodiment 2 of the present invention.

In still another possible implementation manner in this embodiment of the present invention, further, as shown in FIG. 5, the acquiring unit 22 includes a sending module 227 and a third receiving module 228.

The sending module 227 is configured to send a probe request frame to the AP according to the beacon indication frame.

After the receiving unit 21 receives, on any subchannel of the N subchannels, the beacon indication frame sent by the AP, the sending module 227 may directly send the probe request frame to the AP according to the SSID of the AP included in the beacon indication frame, where the probe request frame is used to acquire the access information required for accessing the AP.

The third receiving module 228 is configured to receive a probe response frame sent by the AP, where the probe response frame includes the access information required for accessing the AP.

After the sending module 227 sends the probe request frame to the AP according to the beacon indication frame, the AP may send, to the STA according to the received probe request frame, the probe response frame that carries the access information required for accessing the AP. In this case, the third receiving module 228 may receive the probe response frame that includes the access information required for accessing the AP and is sent by the AP.

When system information of the WLAN system changes, the AP adds to-be-changed system information in the beacon frame to notify the STA. Therefore, after the access unit 23 accesses the AP according to the access information required for accessing the AP, to acquire the to-be-changed system information, the receiving unit 21 further needs to continue to receive the beacon frame sent by the AP. Specifically, the receiving unit 21 may receive, on a subchannel that is accessed or on any subchannel of the N subchannels included in the WLAN system, the beacon indication frame sent by the AP, and then receive, according to the received beacon indication frame, the beacon frame sent by the AP.

In this embodiment of the present invention, to prevent the STA from continuously tracing a network change and from wasting energy of the STA, in a possible implementation manner in this embodiment of the present invention, further, the receiving unit 21 is further configured to receive the beacon indication frame on the subchannel after the access unit 23 accesses the AP according to the access information required for accessing the AP, where the beacon indication frame includes the SSID of the AP, the channel identifier of each first subchannel on which the beacon frame is sent, and the sending time, at which the beacon frame is sent, corresponding to the channel identifier, and the beacon indication frame further includes event notification information; and when the event notification information is used to indicate that system information of the WLAN system does not change, receive the beacon frame according to the beacon indication frame.

Figure 6:
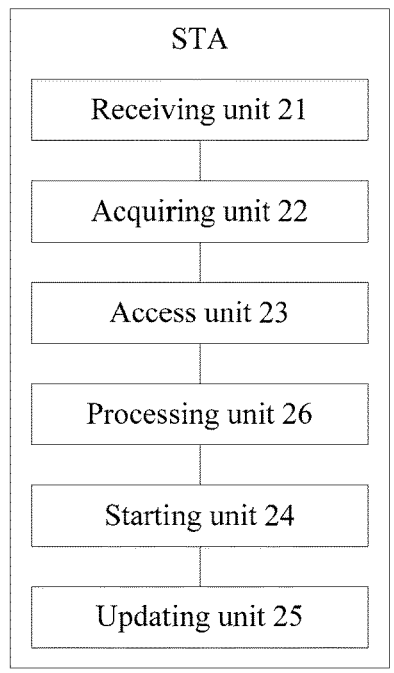
FIG. 6 is a schematic composition diagram of still yet another STA according to Embodiment 2 of the present invention.

In this embodiment of the present invention, further, as shown in FIG. 6, the STA further includes a starting unit 24 and an updating unit 25.

The starting unit 24 is configured to start a timer when the event notification information is used to indicate to-be-changed system information and a remaining time before the to-be-changed system information changes.

Further optionally, when it is determined that the event notification information is used to indicate to-be-changed system information and a remaining time before the to-be-changed system information changes, the STA may further first determine, according to a requirement of the STA and the to-be-changed system information, whether the STA needs to update the to-be-changed system information, and then the starting unit 24 starts the timer after it is determined that the STA needs to update the to-be-changed system information.

The receiving unit 21 is further configured to: when a timing time of the timer is equal to the remaining time before the to-be-changed system information changes, receive a new beacon indication frame on the subchannel.

The acquiring unit 22 is further configured to acquire a new beacon frame according to the new beacon indication frame obtained by the receiving unit 21.

The updating unit 25 is configured to update the to-be-changed system information according to the new beacon frame obtained by the acquiring unit 22.

When the timing time of the timer is equal to the remaining time before the to-be-changed system information changes, a sleep state may be switched to a working state, then the receiving unit 21 receives a new beacon indication frame on a subchannel that is accessed or on any subchannel of the N subchannels included in the WLAN system, then the acquiring unit 22 acquires a new beacon frame according to the new beacon indication frame, and finally, the updating unit 25 updates the to-be-changed system information according to the new beacon frame obtained by the acquiring unit 22.

In another possible implementation manner in this embodiment of the present invention, further, the receiving unit 21 is further configured to receive the beacon indication frame on the subchannel after the access unit 23 accesses the AP according to the access information required for accessing the AP.

The starting unit 24 is further configured to start a timer when the beacon indication frame obtained by the receiving unit 21 includes event notification information, where the event notification information is used to indicate to-be-changed system information and a remaining time before the to-be-changed system information changes.

After the receiving unit 21 receives the beacon indication frame, the STA may first determine whether the received beacon indication frame includes the event notification information. If the STA determines that the beacon indication frame does not include the event notification information, the receiving unit 21 directly receives the beacon frame according to the received beacon indication frame; if the STA determines that the beacon indication frame includes the event notification information, the starting unit 24 starts the timer.

The receiving unit 21 is further configured to: when a timing time of the timer is equal to the remaining time before the to-be-changed system information changes, receive a new beacon indication frame on the subchannel.

The acquiring unit 22 is further configured to acquire a new beacon frame according to the new beacon indication frame obtained by the receiving unit 21.

The updating unit 25 is further configured to update the to-be-changed system information according to the new beacon frame obtained by the acquiring unit 22.

In this embodiment of the present invention, further, to save energy, the STA further includes a processing unit 26.

The processing unit 26 is configured to enter a sleep state before the first starting module 222 or the second starting module 225 starts the timer.

In this embodiment of the present invention, further, the processing unit 26 is further configured to enter a sleep state before the starting unit 24 starts the timer.

In this embodiment of the present invention, further, the receiving unit 21 is specifically configured to receive the beacon indication frame on a subchannel that is accessed or on any subchannel of the N subchannels.

In this embodiment of the present invention, further, the first subchannel is a primary channel.

It should be noted that the system information of the WLAN system in this embodiment of the present invention may include but is not limited to one or a combination of the following information: the configuration information of the beacon frame, first subchannels in the N subchannels included in the WLAN system, and second subchannels in the N subchannels included in the WLAN system, where the second subchannels are subchannels, except the first subchannels, in the N subchannels of the WLAN system.

It should be noted that the STA in this embodiment of the present invention refers to an electronic device having a Wi-Fi function, such as a mobile phone or a terminal. The STA is not specifically limited herein in this embodiment of the present invention.

According to the station provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame. In this way, a STA may acquire, according to the beacon indication frame, access information required for accessing the AP, and access the AP according to the access information required for accessing the AP, which reduces network overheads on a premise of ensuring that the STA fast accesses a network.

In addition, after receiving the beacon indication frame, the STA first enters a sleep state, and then switches, when a timing time of a timer is equal to a remaining time required for receiving the beacon frame, from the sleep state to a working state to receive the beacon frame, thereby saving energy of the STA. In addition, when system information of the WLAN system is about to change, the STA is notified in advance by using event notification information, which prevents the STA from continuously tracing a network change, and further saves the energy of the STA.

Embodiment 3

Figure 7:
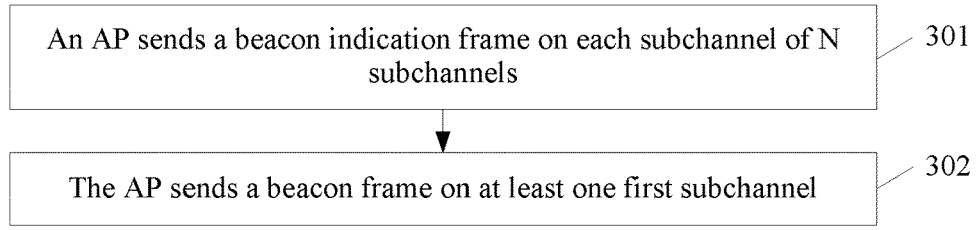
FIG. 7 is a schematic flowchart of a beacon frame sending method according to Embodiment 3 of the present invention.

Embodiment 3 of the present invention provides a beacon frame sending method, applied to a WLAN system, where the WLAN system includes N subchannels, the N subchannels include A first subchannels, N is a positive integer greater than or equal to 2, and A is a positive integer less than N. As shown in FIG. 7, the method may include:

301. An AP sends a beacon indication frame on each subchannel of the N subchannels.

The beacon indication frame is used to indicate configuration information of a beacon frame.

302. The AP sends a beacon frame on at least one first subchannel.

Specifically, in a WLAN system having multiple channels (includes N subchannels), the AP sends, on each subchannel of the N subchannels, a beacon indication frame that is used to indicate configuration information of a beacon frame, and sends the beacon frame only on at least one first subchannel, where an information length of the beacon indication frame is less than an information length of the beacon frame, so that a STA may acquire, according to the received beacon indication frame, access information required for accessing the AP, and further access the AP according to the access information required for accessing the AP.

It should be noted that in this embodiment of the present invention, there are no specific sequence for performing step 301 and step 302, and generally, step 301 and step 302 may be performed concurrently. A specific sequence for performing step 301 and step 302 may be determined according to a requirement of an actual application scenario, and the sequence for performing step 301 and step 302 is not specifically limited herein in this embodiment of the present invention.

It should be noted that the STA in this embodiment of the present invention refers to an electronic device having a Wi-Fi function, such as a mobile phone or a terminal. The STA is not specifically limited herein in this embodiment of the present invention. In addition, the first subchannel in this embodiment of the present invention may be a primary channel.

According to the beacon frame sending method provided in this embodiment of the present invention, in a WLAN system having multiple channels, an AP sends a beacon frame only on at least one first subchannel, and sends, on each subchannel of the multiple channels, a beacon indication frame to indicate configuration information of the beacon frame, which reduces network overheads on a premise of ensuring that a STA fast accesses a network.

Embodiment 4

Figure 8:
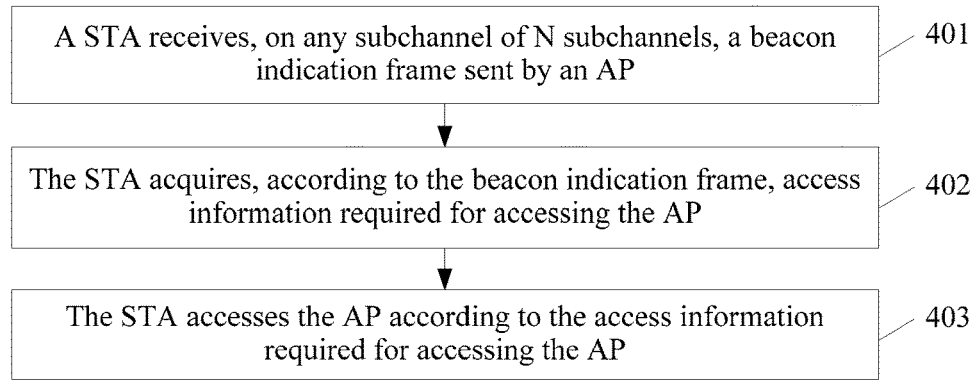
FIG. 8 is a schematic flowchart of a beacon frame sending method according to Embodiment 4 of the present invention.

Embodiment 4 of the present invention provides a beacon frame sending method, applied to a WLAN system, where the WLAN system includes N subchannels, the N subchannels include A first subchannels, N is a positive integer greater than or equal to 2, and A is a positive integer less than N. As shown in FIG. 8, the method may include:

401. A STA receives, on any subchannel of the N subchannels, a beacon indication frame sent by an AP.

The beacon indication frame is used to indicate configuration information of a beacon frame, and the beacon frame is sent by the AP on at least one first subchannel.

402. The STA acquires, according to the beacon indication frame, access information required for accessing the AP.

403. The STA accesses the AP according to the access information required for accessing the AP.

Specifically, in a WLAN system having multiple channels (includes N subchannels), the AP sends, on each subchannel of the N subchannels, a beacon indication frame that is used to indicate configuration information of a beacon frame, and sends the beacon frame only on at least one first subchannel. In this case, the STA only needs to receive, on any subchannel of the N subchannels, the beacon indication frame that is used to indicate the configuration information of the beacon frame and sent by the AP, and then may acquire, according to the received beacon indication frame, access information required for accessing the AP, and access the AP according to the acquired access information required for accessing the AP, which achieves an objective of fast access.

It should be noted that the STA in this embodiment of the present invention refers to an electronic device having a Wi-Fi function, such as a mobile phone or a terminal. The STA is not specifically limited herein in this embodiment of the present invention. In addition, the first subchannel in this embodiment of the present invention may be a primary channel.

According to the beacon frame sending method provided in this embodiment of the present invention, in a WLAN system having multiple channels, an AP sends a beacon frame only on at least one first subchannel, and sends, on each subchannel of the multiple channels, a beacon indication frame to indicate configuration information of the beacon frame. In this way, a STA may acquire, according to the beacon indication frame, access information required for accessing the AP, and access the AP according to the access information required for accessing the AP, which reduces network overheads on a premise of ensuring that the STA fast accesses a network.

Embodiment 5

Figure 9:
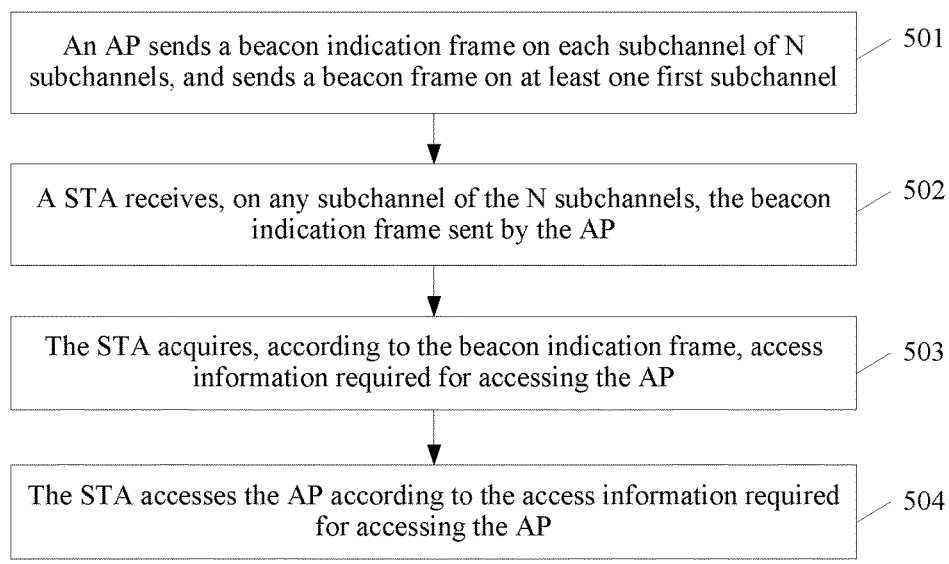
FIG. 9 is a schematic flowchart of a beacon frame sending method according to Embodiment 5 of the present invention.

Embodiment 5 of the present invention provides a beacon frame sending method, applied to a WLAN system, where the WLAN system includes N subchannels, the N subchannels include A first subchannels, N is a positive integer greater than or equal to 2, and A is a positive integer less than N. As shown in FIG. 9, the method may include:

501. An AP sends a beacon indication frame on each subchannel of the N subchannels, and sends a beacon frame on at least one first subchannel.

Specifically, in the WLAN system having N subchannels (where the N subchannels include A first subchannels), to reduce network overheads on a premise of ensuring that a STA fast accesses a network, the AP sends, on each subchannel of the N subchannels included in the WLAN system, a beacon indication frame of which an information length is relatively small and that is used to indicate configuration information of a beacon frame, and sends, on at least one first subchannel, a beacon frame of which an information length is relatively large. The beacon indication frame is used to indicate the configuration information of the beacon frame, and the beacon indication frame may use the following information to indicate the configuration information of the beacon frame: an SSID of the AP, a channel identifier of each first subchannel on which the beacon frame is sent, and a sending time, at which the beacon frame is sent, corresponding to the channel identifier.

The AP may periodically send the beacon indication frame on each subchannel of the N subchannels, and may also periodically send the beacon frame on each first subchannel of the at least one first subchannel. In addition, to save energy of the STA and ensure that the STA fast accesses the network, a period at which the AP sends the beacon indication frame is shorter than a period at which the AP sends the beacon frame.

In this embodiment of the present invention, further optionally, to further save the energy of the STA, the beacon indication frame sent by the AP may further include a time interval, at which the beacon frame is sent on the first subchannel, corresponding to the channel identifier of each first subchannel on which the beacon frame is sent. In this way, after acquiring the time interval at which the beacon frame is sent and that is in the beacon indication frame and corresponding to the channel identifier of each first subchannel on which the beacon frame is sent, in a subsequent process of repeatedly receiving the beacon frame sent by the AP, the STA does not need to be in a listening state all the time, but may switch, at a moment at which the beacon frame is sent and according to the acquired time interval, at which the beacon frame is sent, corresponding to the channel identifier of each first subchannel on which the beacon frame is sent, from a sleep state to a working state to receive the beacon frame sent by the AP.

502. A STA receives, on any subchannel of the N subchannels, the beacon indication frame sent by the AP.

When the STA needs to access a network, the STA may receive, on any subchannel of the N subchannels included in the WLAN system, a beacon indication frame of which an information length is relatively small and that is used to indicate configuration information of a beacon frame and sent by the AP.

503. The STA acquires, according to the beacon indication frame, access information required for accessing the AP.

After the STA receives, on any subchannel of the N subchannels, the beacon indication frame sent by the AP, the STA may acquire, according to the received beacon indication frame, the access information required for accessing the AP. In this embodiment of the present invention, a specific implementation manner in which the STA acquires, according to the beacon indication frame, access information required for accessing the AP includes but is not limited to the following possible implementation manners.

In a possible implementation manner of this embodiment of the present invention, when the AP sends the beacon frame on one first subchannel, that the STA acquires, according to the beacon indication frame, access information required for accessing the AP may specifically include the following step 503a1 to step 503a4:

503a1. The STA determines a first remaining time according to a sending time, at which the beacon frame is sent, corresponding to a channel identifier of the first subchannel on which the beacon frame is sent.

The first remaining time is a remaining time for sending the beacon frame on the first subchannel on which the beacon frame is sent. Because the beacon indication frame includes the sending time, at which the beacon frame is sent on the first subchannel, corresponding to the channel identifier of each first subchannel on which the beacon frame is sent, the STA needs to determine how much time remains from a moment at which the beacon indication frame is received to a sending time at which the AP sends the beacon frame on the first subchannel, that is, the STA needs to determine the first remaining time, so as to receive the beacon frame at the moment at which the AP sends the beacon frame.

503a2. The STA enters a sleep state.

After determining the first remaining time according to the sending time, at which the beacon frame is sent, corresponding to the channel identifier of each first subchannel on which the beacon frame is sent, the STA may first enter the sleep state to save energy.

It should be noted that in this embodiment of the present invention, step 503a2 is an optional step, that is, after the STA determines the first remaining time according to the sending time, at which the beacon frame is sent, corresponding to the channel identifier of each first subchannel on which the beacon frame is sent, step 503a3 may be directly performed.

503a3. The STA starts a timer.

503a4. When a timing time of the timer is equal to the first remaining time, the STA receives the beacon frame according to the channel identifier of each first subchannel on which the beacon frame is sent.

The beacon frame includes the access information required for accessing the AP, and when the AP sends the beacon frame on one first subchannel, the beacon indication frame includes only one channel identifier of a first subchannel on which the beacon frame is sent and a sending time, at which the beacon frame is sent, corresponding to the channel identifier. Specifically, after the STA enters the sleep state and starts the timer, when the timing time of the timer is equal to the first remaining time, the STA may switch from the sleep state to a working state, and receive, according to the channel identifier, included in the beacon indication frame, of the first subchannel on which the beacon frame is sent, the beacon frame that includes the access information required for accessing the AP and is sent by the AP on the first subchannel.

In another possible implementation manner of this embodiment of the present invention, when the AP sends the beacon frame on two or more first subchannels, that the STA acquires, according to the beacon indication frame, access information required for accessing the AP may specifically include the following step 503b1 to step 503b5:

503b1. The STA determines a first channel identifier.

When the AP sends the beacon frame on two or more first subchannels, the beacon indication frame sent by the AP on the subchannel includes a channel identifier of each first subchannel on which the beacon frame is sent and a sending time, at which the beacon frame is sent, corresponding to the channel identifier. In this case, after receiving, on any subchannel of the N subchannels, the beacon indication frame sent by the AP, the STA first needs to determine the first channel identifier, where the first channel identifier is a channel identifier of a first subchannel that is used to receive the beacon frame.

In a possible implementation manner of this embodiment of the present invention, the determining a first channel identifier may be specifically: determining, by the STA according to the beacon indication frame, a channel identifier corresponding to a sending time that is the earliest in sending times for sending the beacon frame, as the first channel identifier; or in another possible implementation manner of this embodiment of the present invention, the determining a first channel identifier may be specifically: determining, by the STA according to a radio frequency capability of a receiver of the STA, a channel identifier of a first subchannel supported by the STA, as the first channel identifier.

503b2. Determine a second remaining time according to a sending time, at which the beacon frame is sent, corresponding to the first channel identifier.

The second remaining time is a remaining time for sending the beacon frame on the first subchannel corresponding to the first channel identifier. Because the beacon indication frame includes the sending time, at which the beacon frame is sent on the first subchannel, corresponding to the channel identifier of each first subchannel on which the beacon frame is sent, after determining the first channel identifier of the first subchannel that is used to receive the beacon frame, the STA further needs to determine how much time remains from a moment at which the beacon indication frame is received to a sending time at which the AP sends the beacon frame on the first subchannel corresponding to the first channel identifier, that is, the STA needs to determine the second remaining time, so as to receive the beacon frame at the moment at which the AP sends the beacon frame on the first subchannel corresponding to the first channel identifier.

503b3. The STA enters a sleep state.

After determining the second remaining time according to the sending time, at which the beacon frame is sent, corresponding to the first channel identifier, the STA may first enter the sleep state to save energy.

It should be noted that in this embodiment of the present invention, step 503b3 is an optional step, that is, after the STA determines the second remaining time according to the sending time, at which the beacon frame is sent, corresponding to the first channel identifier, step 503b4 may be directly performed.

503b4. The STA starts a timer.

503b5. When a timing time of the timer is equal to the second remaining time, the STA receives the beacon frame according to the first channel identifier.

The beacon frame includes the access information required for accessing the AP. Specifically, after the STA enters the sleep state and starts the timer, when the timing time of the timer is equal to the second remaining time, the STA may switch from the sleep state to a working state, and receive, according to the first channel identifier, the beacon frame that includes the access information required for accessing the AP and is sent by the AP on the first subchannel corresponding to the first channel identifier.

In still another possible implementation manner of this embodiment of the present invention, the acquiring, according to the beacon indication frame, access information required for accessing the AP may specifically include the following step 503c1 to step 503c2:

503c1. The STA sends a probe request frame to the AP according to the beacon indication frame.

After the STA receives, on any subchannel of the N subchannels, the beacon indication frame sent by the AP, the STA may directly send the probe request frame to the AP according to the SSID of the AP included in the beacon indication frame, where the probe request frame is used to acquire the access information required for accessing the AP.

503c2. The STA receives a probe response frame sent by the AP.

The probe response frame includes the access information required for accessing the AP. After the STA sends the probe request frame to the AP according to the beacon indication frame, the AP may send, to the STA according to the received probe request frame, a probe response frame that carries the access information required for accessing the AP. In this case, the STA may receive the probe response frame that includes the access information required for accessing the AP and is sent by the AP.

504. The STA accesses the AP according to the access information required for accessing the AP.

When system information of the WLAN system changes, the AP adds to-be-changed system information in the beacon frame to notify the STA. Therefore, after the STA accesses the AP according to the access information required for accessing the AP, to acquire the to-be-changed system information, the STA further needs to continue to receive the beacon frame sent by the AP. Specifically, the STA may receive, on a subchannel that is accessed or on any subchannel of the N subchannels included in the WLAN system, the beacon indication frame sent by the AP, and then receive, according to the received beacon indication frame, the beacon frame sent by the AP. It should be noted that the system information of the WLAN system in this embodiment of the present invention may include but is not limited to one or a combination of the following information: the configuration information of the beacon frame, first subchannels in the N subchannels included in the WLAN system, and second subchannels in the N subchannels included in the WLAN system, where the second subchannels are subchannels, except the first subchannels, in the N subchannels of the WLAN system.

Figure 10:
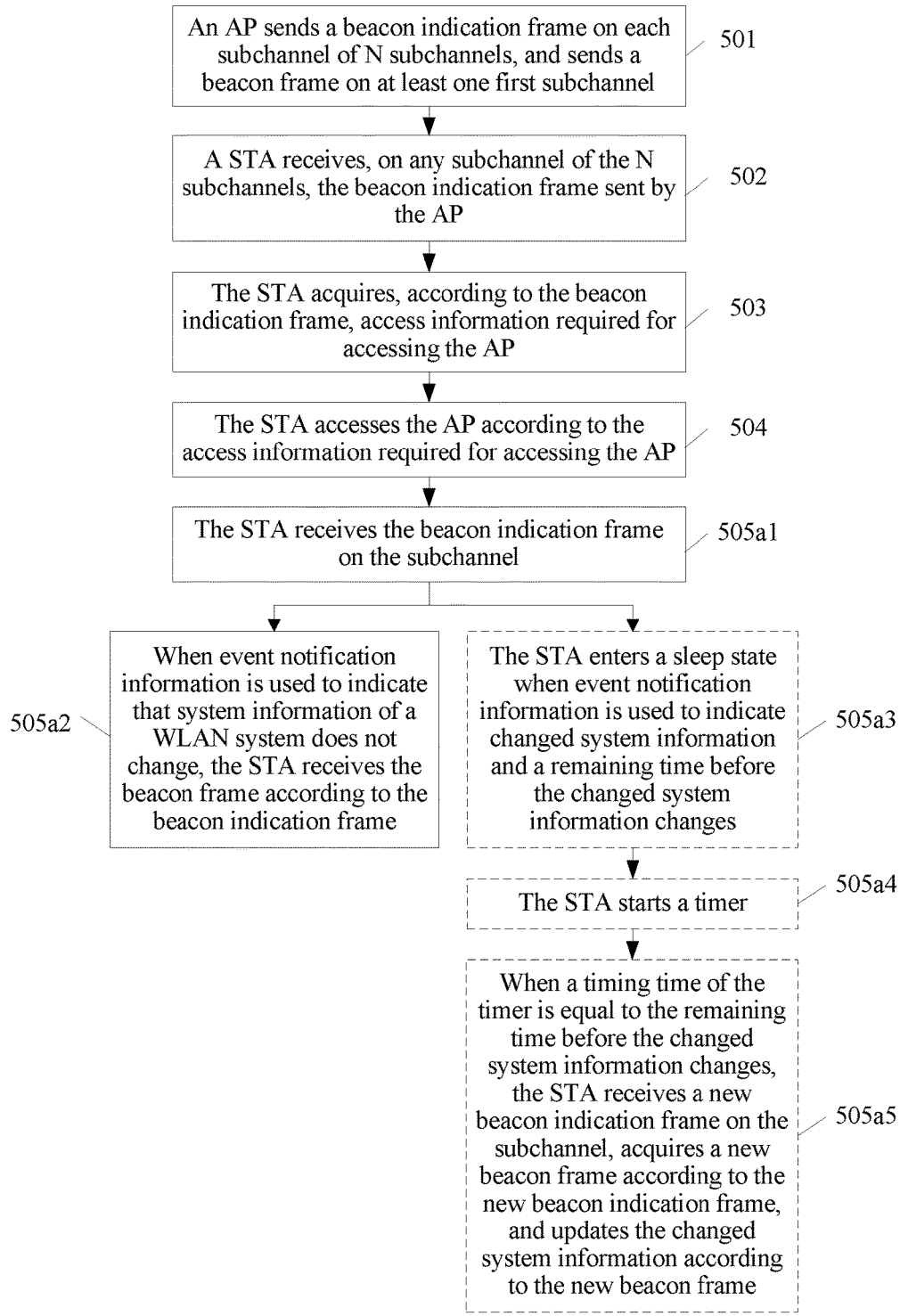
FIG. 10 is a schematic flowchart of another beacon frame sending method according to Embodiment 5 of the present invention.

In this embodiment of the present invention, to prevent the STA from continuously tracing a network change and from wasting energy of the STA, in a possible implementation manner, the AP may add event notification information to the sent beacon indication frame. In addition, when system information of the WLAN system does not change, the event notification information is used to indicate that the system information of the WLAN system does not change; when the system information of the WLAN system needs to be changed, the event notification information is used to indicate to-be-changed system information and a remaining time before the to-be-changed system information changes. As shown in FIG. 10, a specific process in which after accessing the AP according to the access information required for accessing the AP, the STA continues to receive the beacon frame sent by the AP may include the following step 505a1 and step 505a2, or include the following step 505a1 and step 505a3 to step 505a5.

505a1. The STA receives the beacon indication frame on the subchannel.

The STA may receive, on a subchannel that is accessed or on any subchannel of the N subchannels included in the WLAN system, the beacon indication frame sent by the AP, where the beacon indication frame includes the SSID of the AP, the channel identifier of each first subchannel on which the beacon frame is sent, and the sending time, at which the beacon frame is sent, corresponding to the channel identifier, and the beacon indication frame further includes the event notification information.

After receiving the beacon indication frame that includes the event notification information, the STA may receive the beacon frame according to a specific function of the event notification information. In a possible implementation manner, the following step 505a2 is performed. In another possible implementation manner, the following step 505a3 to step 505a5 are performed.

505a2. When event notification information is used to indicate that system information of the WLAN system does not change, the STA receives the beacon frame according to the beacon indication frame.

After the STA receives the beacon indication frame that includes the event notification information, when the event notification information is used to indicate that the system information of the WLAN system does not change, the STA may receive the beacon frame according to the received beacon indication frame.

It should be noted that for a specific implementation method in which the STA receives the beacon frame according to the received beacon indication frame, refer to specific description of step 503a1 to step 503a4 in this embodiment of the present invention or of step 503b1 to step 503b5 in this embodiment of the present invention, which is not described herein again in this embodiment of the present invention.

505a3. The STA enters a sleep state when event notification information is used to indicate to-be-changed system information and a remaining time before the to-be-changed system information changes.

Optionally, to save energy, the STA may first enter the sleep state when it is determined that the event notification information is used to indicate the to-be-changed system information and the remaining time before the to-be-changed system information changes.

In this embodiment of the present invention, further optionally, when it is determined that the event notification information is used to indicate the to-be-changed system information and the remaining time before the to-be-changed system information changes, the STA may further first determine, according to a requirement of the STA and the to-be-changed system information, whether the STA needs to update the to-be-changed system information, and then enter the sleep state after determining that the STA needs to update the to-be-changed system information.

505a4. The STA starts a timer.

505a5. When a timing time of the timer is equal to the remaining time before the to-be-changed system information changes, the STA receives a new beacon indication frame on the subchannel, acquires a new beacon frame according to the new beacon indication frame, and updates the to-be-changed system information according to the new beacon frame.

When the timing time of the timer is equal to the remaining time before the to-be-changed system information changes, the STA may switch from the sleep state to a working state, then receive a new beacon indication frame on a subchannel that is accessed or on any subchannel of the N subchannels included in the WLAN system, then acquire a new beacon frame according to the new beacon indication frame, and update the to-be-changed system information according to the new beacon frame.

To help persons skilled in the art understand, this embodiment of the present invention provides an example of event notification information. For example, in event notification information, a binary sequence is used to represent a specific function of the event notification information, where 3 bits are used to represent that system information of the WLAN system does not need to be changed or to-be-changed system information (as shown in Table 1, where a correspondence that is shown in Table 1 and between a binary sequence and that system information of the WLAN system does not need to be changed or that the system information needs to be changed may be agreed on in advance by the AP and the STA, or may be added by the AP in a beacon indication frame to notify the STA), and 5 bits are used to represent a remaining time before the to-be-changed system information changes. When the AP needs to update a configuration of a beacon frame after 18 time intervals at which the beacon indication frame is sent, the AP may add, to the beacon indication frame, event notification information that is used to represent updating the configuration of the beacon frame after the 18 time intervals at which the beacon indication frame is sent. With reference to Table 1, it may be learned that the event notification information is 10010010, where the first 3 bits 100 represent that the AP updates the configuration of the beacon frame, and the last 5 bits represent that a time at which the AP updates the configuration of the beacon frame is after the 18 time intervals at which the beacon indication frame is sent. In this way, after receiving the beacon indication frame that includes 10010010, the STA may first enter a sleep state, then start a timer, after a timing time of the timer is equal to 18 time intervals at which the beacon indication frame is sent, re-enter a working state and receive a new beacon indication frame, then acquire a new beacon frame (a beacon frame obtained after configuration updating is performed) according to the new beacon indication frame, and finally update the to-be-changed system information according to the new beacon frame.

TABLE 1

| Binary sequence | System information of a WLAN system does not need to be changed or the system information needs to be changed |
|---|---|
| 000 | System information of a WLAN system does not need to be changed |
| 001 | A first subchannel needs to be changed |
| 010 | A working/control channel needs to be changed |
| 100 | A configuration of a beacon frame needs to be changed |

It should be noted that for a specific implementation method in which the STA receives the new beacon frame according to the received new beacon indication frame, refer to specific description of step 503$a$1 to step 503$a$4 in this embodiment of the present invention or of step 503$b$1 to step 503$b$5 in this embodiment of the present invention, which is not described herein again in this embodiment of the present invention.

Figure 11:
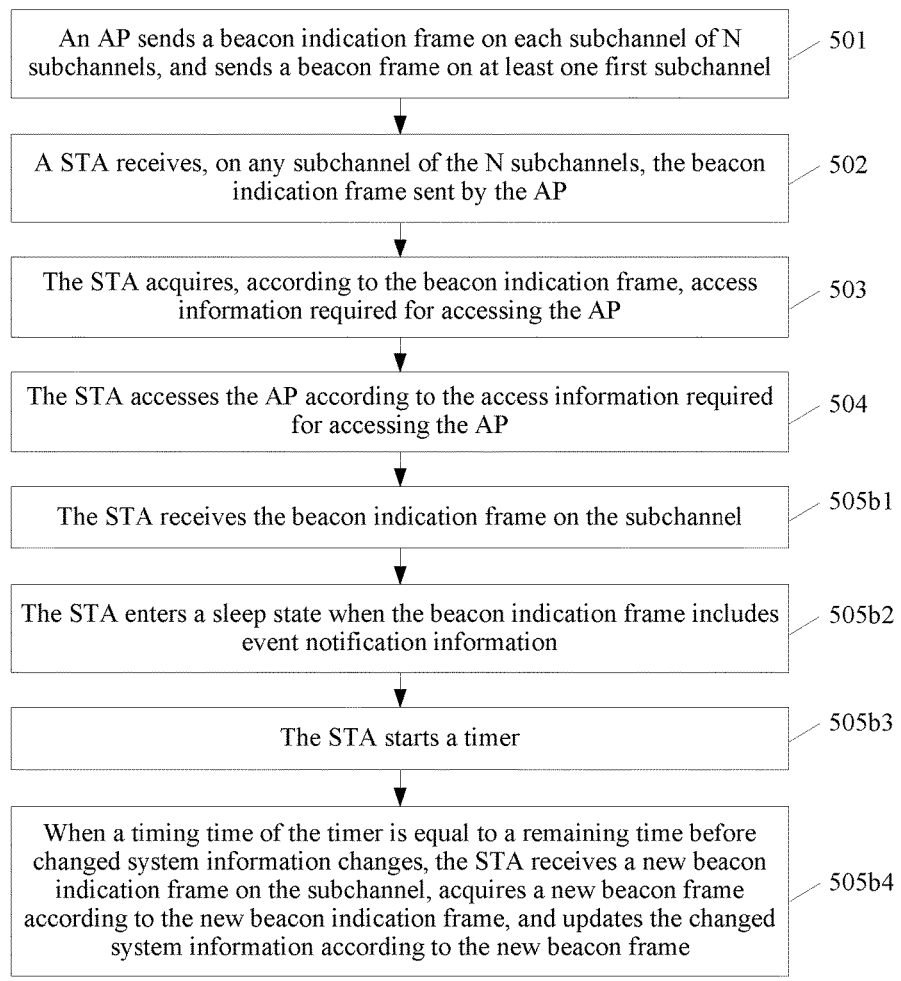
FIG. 11 is a schematic flowchart of still another beacon frame sending method according to Embodiment 5 of the present invention.

In another possible implementation manner, when system information of the WLAN system does not change, the AP does not add event notification information to the beacon indication frame; when the system information of the WLAN system needs to be changed, the AP adds the event notification information to the beacon indication frame, and the event notification information is used to indicate to-be-changed system information and a remaining time before the to-be-changed system information changes. As shown in FIG. 11, a specific process in which after accessing the AP according to the access information required for accessing the AP, the STA continues to receive the beacon frame sent by the AP may include the following step 505$b$1 to step 505$b$4.

505$b$1. The STA receives the beacon indication frame on the subchannel.

The STA may receive, on a subchannel that is accessed or on any subchannel of the N subchannels included in the WLAN system, the beacon indication frame sent by the AP, where the beacon indication frame includes the SSID of the AP, the channel identifier of each first subchannel on which the beacon frame is sent, and the sending time, at which the beacon frame is sent, corresponding to the channel identifier.

After receiving the beacon indication frame, the STA may first determine whether the received beacon indication frame includes the event notification information. If the STA determines that the beacon indication frame does not include the event notification information, the STA receives the beacon frame according to the received beacon indication frame. If the STA determines that the beacon indication frame includes the event notification information, the following step 505$b$2 to step 505$b$4 are performed, where the event notification information is used to indicate to-be-changed system information and a remaining time before the to-be-changed system information changes.

It should be noted that for a specific implementation method in which the STA receives the beacon frame according to the received beacon indication frame, refer to specific description of step 503$a$1 to step 503$a$4 in this embodiment of the present invention or of step 503$b$1 to step 503$b$5 in this embodiment of the present invention, which is not described herein again in this embodiment of the present invention.

505$b$2. The STA enters a sleep state when the beacon indication frame includes event notification information.

Optionally, to save energy, the STA may first enter the sleep state when determining that the beacon indication frame includes the event notification information.

Optionally, when determining that the beacon indication frame includes the event notification information, the STA may first determine, according to the event notification information, whether the to-be-changed system information needs to be updated, and enter the sleep state after determining that the to-be-changed system information needs to be updated.

It should be noted that for an example of the event notification information in this implementation manner, refer to the example of the event notification information in the another implementation manner of the present invention, which is not described herein again in this embodiment of the present invention.

505$b$3. The STA starts a timer.

505$b$4. When a timing time of the timer is equal to the remaining time before the to-be-changed system information changes, the STA receives a new beacon indication frame on the subchannel, acquires a new beacon frame according to the new beacon indication frame, and updates the to-be-changed system information according to the new beacon frame.

It should be noted that for a specific implementation method in which the STA receives the new beacon frame according to the received new beacon indication frame, refer to specific description of step 503$a$1 to step 503$a$4 in this embodiment of the present invention or of step 503$b$1 to step 503$b$5 in this embodiment of the present invention, which is not described herein again in this embodiment of the present invention.

It should be noted that the STA in this embodiment of the present invention refers to an electronic device having a Wi-Fi function, such as a mobile phone or a terminal. The STA is not specifically limited herein in this embodiment of the present invention. In addition, the first subchannel in this embodiment of the present invention may be a primary channel.

According to the beacon frame sending method provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame, so that a STA acquires, according to the beacon indication frame, access information required for accessing the AP, and accesses the AP according to the access information required for accessing the AP, which reduces network overheads on a premise of ensuring that the STA fast accesses a network.

In addition, after receiving the beacon indication frame, the STA first enters a sleep state, and then switches, when a timing time of a timer is equal to a remaining time required for receiving the beacon frame, from the sleep state to a working state to receive the beacon frame, thereby saving energy of the STA. In addition, when system information of the WLAN system is about to change, the STA is notified in advance by using event notification information, which prevents the STA from continuously tracing a network change, and further saves the energy of the STA.

Embodiment 6

Figure 12:
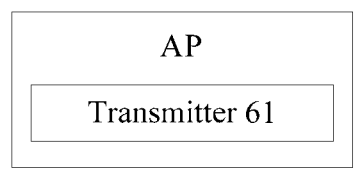
FIG. 12 is a schematic composition diagram of an AP according to Embodiment 6 of the present invention.

Embodiment 6 of the present invention provides an AP, applied to a WLAN system, where the WLAN system includes N subchannels, the N subchannels include A first subchannels, N is a positive integer greater than or equal to 2, and A is a positive integer less than N. As shown in FIG. 12, the AP includes a transmitter 61.

The transmitter 61 is configured to: send a beacon indication frame on each subchannel of the N subchannels, where the beacon indication frame is used to indicate configuration information of a beacon frame; and send the beacon frame on at least one first subchannel.

In this embodiment of the present invention, further, the beacon indication frame includes a service set identifier SSID of the AP, a channel identifier of each first subchannel on which the beacon frame is sent, and a sending time, at which the beacon frame is sent, corresponding to the channel identifier.

In this embodiment of the present invention, further, the beacon indication frame further includes a time interval, at which the beacon frame is sent, corresponding to the channel identifier of each first subchannel on which the beacon frame is sent.

In this embodiment of the present invention, further, the beacon indication frame further includes event notification information, where when system information of the WLAN system does not change, the event notification information is used to indicate that the system information of the WLAN system does not change, and when the system information of the WLAN system needs to be changed, the event notification information is used to indicate to-be-changed system information and a remaining time before the to-be-changed system information changes.

In this embodiment of the present invention, further, when system information of the WLAN system changes, the beacon indication frame further includes event notification information, where the event notification information is used to indicate to-be-changed system information and a remaining time before the to-be-changed system information changes.

In this embodiment of the present invention, further, the first subchannel is a primary channel.

It should be noted that the system information of the WLAN system in this embodiment of the present invention may include but is not limited to one or a combination of the following information: the configuration information of the beacon frame, first subchannels in the N subchannels included in the WLAN system, and second subchannels in the N subchannels included in the WLAN system, where the second subchannels are subchannels, except the first subchannels, in the N subchannels of the WLAN system.

It should be noted that the STA in this embodiment of the present invention refers to an electronic device having a Wi-Fi function, such as a mobile phone or a terminal. The STA is not specifically limited herein in this embodiment of the present invention.

It should be noted that for specific description of a function module in the AP provided in this embodiment of the present invention, refer to specific description of corresponding content in the method embodiments and the apparatus embodiments, and details are not described herein again in this embodiment of the present invention.

According to the AP provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame, so that a STA acquires, according to the beacon indication frame, access information required for accessing the AP, and accesses the AP according to the access information required for accessing the AP, which reduces network overheads on a premise of ensuring that the STA fast accesses a network.

In addition, after receiving the beacon indication frame, the STA first enters a sleep state, and then switches, when a timing time of a timer is equal to a remaining time required for receiving the beacon frame, from the sleep state to a working state to receive the beacon frame, thereby saving energy of the STA. In addition, when system information of the WLAN system is about to change, the STA is notified in advance by using event notification information, which prevents the STA from continuously tracing a network change, and further saves the energy of the STA.

Embodiment 7

Figure 13:
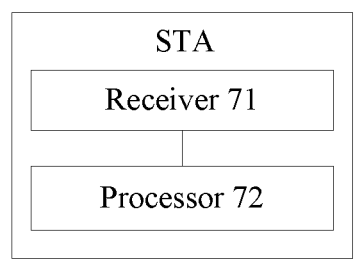
FIG. 13 is a schematic composition diagram of a STA according to Embodiment 7 of the present invention.

Embodiment 7 of the present invention provides a STA, applied to a WLAN system, where the WLAN system includes N subchannels, the N subchannels include A first subchannels, N is a positive integer greater than or equal to 2, and A is a positive integer less than N. As shown in FIG. 13, the STA includes a receiver 71 and a processor 72.

The receiver 71 is configured to receive, on any subchannel of the N subchannels, a beacon indication frame sent by an access point AP, where the beacon indication frame is used to indicate configuration information of a beacon frame, and the beacon frame is sent by the AP on at least one first subchannel.

The processor 72 is configured to: acquire, according to the beacon indication frame obtained by the receiver 71, access information required for accessing the AP; and access the AP according to the access information required for accessing the AP.

In this embodiment of the present invention, further optionally, the beacon indication frame includes a service set identifier SSID of the AP, a channel identifier of each first subchannel on which the beacon frame is sent, and a sending time, at which the beacon frame is sent, corresponding to the channel identifier.

In this embodiment of the present invention, further optionally, when the AP sends the beacon frame on one first subchannel, the processor 72 is specifically configured to:

determine a first remaining time according to the sending time, at which the beacon frame is sent, corresponding to the channel identifier of each first subchannel on which the beacon frame is sent, where the first remaining time is a remaining time for sending the beacon frame on the first subchannel on which the beacon frame is sent;

start a timer; and when a timing time of the timer is equal to the first remaining time, receive the beacon frame according to the channel identifier of each first subchannel on which the beacon frame is sent, where the beacon frame includes the access information required for accessing the AP.

In this embodiment of the present invention, further optionally, when the AP sends the beacon frame on two or more first subchannels, the processor 72 is specifically configured to:

determine a first channel identifier, where the first channel identifier is a channel identifier of a first subchannel that is used to receive the beacon frame;

determine a second remaining time according to a sending time, at which the beacon frame is sent, corresponding to the first channel identifier, where the second remaining time is a remaining time for sending the beacon frame on the first subchannel corresponding to the first channel identifier;

start a timer; and when a timing time of the timer is equal to the second remaining time, receive the beacon frame according to the first channel identifier, where the beacon frame includes the access information required for accessing the AP.

In this embodiment of the present invention, further optionally, the processor 72 is specifically configured to: determine, according to the beacon indication frame, a channel identifier corresponding to a sending time that is the earliest in sending times for sending the beacon frame, as the first channel identifier; or determine, according to a radio frequency capability of the receiver 71 of the STA, a channel identifier of a first subchannel supported by the STA, as the first channel identifier.

In this embodiment of the present invention, further optionally, the processor 72 is specifically configured to:

send a probe request frame to the AP according to the beacon indication frame; and receive a probe response frame sent by the AP, where the probe response frame includes the access information required for accessing the AP.

In this embodiment of the present invention, further optionally, the receiver 71 is further configured to receive the beacon indication frame on the subchannel after the processor 72 accesses the AP according to the access information required for accessing the AP, where the beacon indication frame further includes event notification information; and when the event notification information is used to indicate that system information of the WLAN system does not change, receive the beacon frame according to the beacon indication frame.

In this embodiment of the present invention, further optionally, the processor 72 is further configured to start a timer when the event notification information is used to indicate to-be-changed system information and a remaining time before the to-be-changed system information changes.

The receiver 71 is further configured to: when a timing time of the timer is equal to the remaining time before the to-be-changed system information changes, receive a new beacon indication frame on the subchannel.

The processor 72 is further configured to: acquire a new beacon frame according to the new beacon indication frame obtained by the receiver 71, and update the to-be-changed system information according to the new beacon frame.

In this embodiment of the present invention, further, the receiver 71 is further configured to receive the beacon indication frame on the subchannel after the processor 72 accesses the AP according to the access information required for accessing the AP.

The processor 72 is further configured to start a timer when the beacon indication frame includes event notification information, where the event notification information is used to indicate to-be-changed system information and a remaining time before the to-be-changed system information changes.

The receiver 71 is further configured to: when a timing time of the timer is equal to the remaining time before the to-be-changed system information changes, receive a new beacon indication frame on the subchannel.

The processor 72 is further configured to: acquire a new beacon frame according to the new beacon indication frame obtained by the receiver 71, and update the to-be-changed system information according to the new beacon frame.

In this embodiment of the present invention, further optionally, the processor 72 is further configured to enter a sleep state before the timer is started.

In this embodiment of the present invention, further optionally, the receiver 71 is specifically configured to receive the beacon indication frame on a subchannel that is accessed or on any subchannel of the N subchannels.

In this embodiment of the present invention, further optionally, the first subchannel is a primary channel.

It should be noted that the system information of the WLAN system in this embodiment of the present invention may include but is not limited to one or a combination of the following information: the configuration information of the beacon frame, first subchannels in the N subchannels included in the WLAN system, and second subchannels in the N subchannels included in the WLAN system, where the second subchannels are subchannels, except the first subchannels, in the N subchannels of the WLAN system.

It should be noted that the STA in this embodiment of the present invention refers to an electronic device having a Wi-Fi function, such as a mobile phone or a terminal. The STA is not specifically limited herein in this embodiment of the present invention.

It should be noted that for specific description of function modules in the STA provided in this embodiment of the present invention, refer to specific description of corresponding content in the method embodiments and the apparatus embodiments, and details are not described herein again in this embodiment of the present invention.

According to the STA provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame, so that a STA acquires, according to the beacon indication frame, access information required for accessing the AP, and accesses the AP according to the access information required for accessing the AP, which reduces network overheads on a premise of ensuring that the STA fast accesses a network.

In addition, after receiving the beacon indication frame, the STA first enters a sleep state, and then switches, when a timing time of a timer is equal to a remaining time required for receiving the beacon frame, from the sleep state to a working state to receive the beacon frame, thereby saving energy of the STA. In addition, when system information of the WLAN system is about to change, the STA is notified in advance by using event notification information, which prevents the STA from continuously tracing a network change, and further saves the energy of the STA.

Embodiment 8

Figure 14:
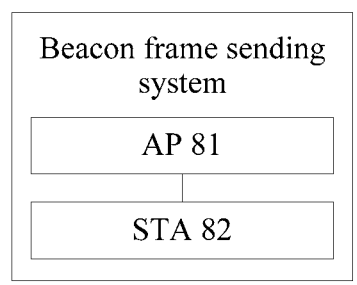
FIG. 14 is a schematic composition diagram of a beacon frame sending system according to Embodiment 8 of the present invention.

Embodiment 8 of the present invention provides a beacon frame sending system, applied to a WLAN system, where the WLAN system includes N subchannels, the N subchannels include A first subchannels, N is a positive integer greater than or equal to 2, and A is a positive integer less than N. As shown in FIG. 14, the beacon frame sending system includes an AP 81 and a STA 82.

The AP 81 is configured to: send a beacon indication frame on each subchannel of the N subchannels, where the beacon indication frame is used to indicate configuration information of a beacon frame; and send the beacon frame on at least one first subchannel.

The STA 82 is configured to: receive, on any subchannel of the N subchannels, the beacon indication frame sent by the access point AP 81; acquire, according to the beacon indication frame, access information required for accessing the AP 81; and access the AP 81 according to the access information required for accessing the AP 81.

It should be noted that for specific description of function modules in the beacon frame sending system provided in this embodiment of the present invention, refer to specific description of corresponding content in the method embodiments and the apparatus embodiments, and details are not described herein again in this embodiment of the present invention.

According to the beacon frame sending system provided in this embodiment of the present invention, in a WLAN system having multiple channels, an AP sends a beacon frame only on at least one first subchannel, and sends, on each subchannel of the multiple channels, a beacon indication frame of which an information length is relatively small to indicate configuration information of the beacon frame, so that a STA acquires, according to the beacon indication frame, access information required for accessing the AP, and accesses the AP according to the access information required for accessing the AP, which reduces network overheads on a premise of ensuring that the STA fast accesses a network.

In addition, after receiving the beacon indication frame, the STA first enters a sleep state, and then switches, when a timing time of a timer is equal to a remaining time required for receiving the beacon frame, from the sleep state to a working state to receive the beacon frame, thereby saving energy of the STA. In addition, when system information of the WLAN system is about to change, the STA is notified in advance by using event notification information, which prevents the STA from continuously tracing a network change, and further saves the energy of the STA.

Based on the foregoing descriptions of the embodiments, persons skilled in the art may clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a specific working process of the foregoing apparatus, refer to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, that is, may be located in one position, or may be distributed on a plurality of different positions. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer or a chip) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A station (STA), applied to a wireless local area network (WLAN) system, wherein the WLAN system comprises N subchannels, the N subchannels comprise A first subchannels, N is a positive integer greater than or equal to 2, A is a positive integer less than N, and the STA comprises:
    a receiver, configured to receive, on any subchannel of the N subchannels, a beacon indication frame sent by an access point (AP), wherein the beacon indication frame is used to indicate configuration information of a beacon frame, and the beacon frame is sent by the AP on at least one first subchannel;
    a processor, configured to acquire, according to the beacon indication frame obtained by the receiver, access information required for accessing the AP; and
    access the AP according to the access information that is required for accessing the AP and obtained by the processor;
    wherein the beacon indication frame comprises a service set identifier (SSID) of the AP, a channel identifier of each first subchannel on which the beacon frame is sent, and a sending time at which the beacon frame is sent, corresponding to the channel identifier;
    wherein when the AP sends the beacon frame on one first subchannel, the processor is further configured to:
    determine a first remaining time according to the sending time, at which the beacon frame is sent, corresponding to the channel identifier of each first subchannel on which the beacon frame is sent, wherein the first remaining time is a remaining time for sending the beacon frame on the first subchannel on which the beacon frame is sent;

start a timer; and when a timing time of the timer is equal to the first remaining time, the receiver is configured to: receive the beacon frame according to the channel identifier of each first subchannel on which the beacon frame is sent, wherein the beacon frame comprises the access information required for accessing the AP.

2. The STA according to claim 1, wherein:

the receiver is further configured to receive the beacon indication frame on the subchannel after the processor accesses the AP according to the access information required for accessing the AP, wherein the beacon indication frame further comprises event notification information; and when the event notification information is used to indicate that system information of the WLAN system does not change, receive the beacon frame according to the beacon indication frame.

3. The STA according to claim 2, wherein:

the processor is further configured to start a timer when the event notification information is used to indicate to-be-changed system information and a remaining time before the to-be-changed system information changes, wherein the receiver is further configured to: when a timing time of the timer is equal to the remaining time before the to-be-changed system information changes, receive a new beacon indication frame on the subchannel; and the processor is further configured to acquire a new beacon frame according to the new beacon indication frame obtained by the receiver; and update the to-be-changed system information according to the new beacon frame obtained by the processor.

4. A beacon frame sending method, applied to a wireless local area network (WLAN) system, wherein the WLAN system comprises N subchannels, the N subchannels comprise A first subchannels, N is a positive integer greater than or equal to 2, A is a positive integer less than N, and the method comprises:

receiving, by a station (STA) on any subchannel of the N subchannels, a beacon indication frame sent by an access point (AP), wherein the beacon indication frame is used to indicate configuration information of a beacon frame, and the beacon frame is sent by the AP on at least one first subchannel;

acquiring, according to the beacon indication frame, access information required for accessing the AP; and accessing the AP according to the access information required for accessing the AP;

wherein the beacon indication frame comprises a service set identifier (SSID) of the AP, a channel identifier of each first subchannel on which the beacon frame is sent, and a sending time, at which the beacon frame is sent, corresponding to the channel identifier;

wherein when the AP sends the beacon frame on one first subchannel, the method comprises:

determining a first remaining time according to the sending time, at which the beacon frame is sent, corresponding to the channel identifier of each first subchannel on which the beacon frame is sent, wherein the first remaining time is a remaining time for sending the beacon frame on which the beacon frame is sent;

starting a timer; and when a timing time of the timer is equal to the first remaining time, receiving the beacon frame according to the channel identifier of each first subchannel on which the beacon frame is sent, wherein the beacon frame comprises the access information required for accessing the AP.

5. The method according to claim 4, wherein the determining a first channel identifier comprises:

determining, according to the beacon indication frame, a channel identifier corresponding to a sending time that is the earliest in sending times for sending the beacon frame, as the first channel identifier; or determining, according to a radio frequency capability of a receiver of the STA, a channel identifier of a first subchannel supported by the STA, as the first channel identifier.

6. The method according to claim 4, wherein the acquiring, according to the beacon indication frame, access information required for accessing the AP comprises:

sending a probe request frame to the AP according to the beacon indication frame; and receiving a probe response frame sent by the AP, wherein the probe response frame comprises the access information required for accessing the AP.

7. The method according to claim 4, after the accessing the AP according to the access information required for accessing the AP, further comprising:

receiving the beacon indication frame on the subchannel, wherein the beacon indication frame further comprises event notification information; and when the event notification information is used to indicate that system information of the WLAN system does not change, receiving the beacon frame according to the beacon indication frame.

8. The method according to claim 7, further comprising:

starting a timer when the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

9. The method according to claim 4, after the accessing the AP according to the access information required for accessing the AP, further comprising:

receiving the beacon indication frame on the subchannel;

starting a timer when the beacon indication frame comprises event notification information, wherein the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

10. A station (STA), applied to a wireless local area network (WLAN) system, wherein the WLAN system comprises N subchannels, the N subchannels comprise A first subchannels, N is a positive integer greater than or equal to 2, A is a positive integer less than N, and the STA comprises:
   a receiver, configured to receive, on any subchannel of the N subchannels, a beacon indication frame sent by an access point (AP), wherein the beacon indication frame is used to indicate configuration information of a beacon frame, and the beacon frame is sent by the AP on at least one first subchannel;
   a processor, configured to acquire, according to the beacon indication frame obtained by the receiver, access information required for accessing the AP; and
   access the AP according to the access information that is required for accessing the AP and obtained by the processor;
   wherein the beacon indication frame comprises a service set identifier (SSID) of the AP, a channel identifier of each first subchannel on which the beacon frame is sent, and a sending time, at which the beacon frame is sent, corresponding to the channel identifier;
   when the AP sends the beacon frame on two or more first subchannels, the processor is further configured to:
   determine a first channel identifier, wherein the first channel identifier is a channel identifier of a first subchannel that is used to receive the beacon frame,
   determine a second remaining time according to a sending time, at which the beacon frame is sent, corresponding to the first channel identifier, wherein the second remaining time is a remaining time for sending the beacon frame on the first subchannel corresponding to the first channel identifier;
   start a timer;
   when a timing time of the timer is equal to the second remaining time, the receiver is configured to: receive the beacon frame according to the first channel identifier, wherein the beacon frame comprises the access information required for accessing the AP.

11. The STA according to claim 10, wherein:
the receiver is further configured to receive the beacon indication frame on the subchannel after the processor accesses the AP according to the access information required for accessing the AP, wherein the beacon indication frame further comprises event notification information; and when the event notification information is used to indicate that system information of the WLAN system does not change, receive the beacon frame according to the beacon indication frame.

12. The STA according to claim 10, wherein:
the processor is further configured to start a timer when the event notification information is used to indicate to-be-changed system information and a remaining time before the to-be-changed system information changes, wherein the receiver is further configured to: when a timing time of the timer is equal to the remaining time before the to-be-changed system information changes, receive a new beacon indication frame on the subchannel; and the processor is further configured to acquire a new beacon frame according to the new beacon indication frame obtained by the receiver; and update the to-be-changed system information according to the new beacon frame obtained by the processor.

13. A beacon frame sending method, applied to a wireless local area network (WLAN) system, wherein the WLAN system comprises N subchannels, the N subchannels comprise A first subchannels, N is a positive integer greater than or equal to 2, A is a positive integer less than N, and the method comprises:
   receiving, by a station (STA) on any subchannel of the N subchannels, a beacon indication frame sent by an access point (AP), wherein the beacon indication frame is used to indicate configuration information of a beacon frame, and the beacon frame is sent by the AP on at least one first subchannel;
   acquiring, according to the beacon indication frame, access information required for accessing the AP; and
   accessing the AP according to the access information required for accessing the AP;
   wherein the beacon indication frame comprises a service set identifier (SSID) of the AP, a channel identifier of each first subchannel on which the beacon frame is sent, and a sending time, at which the beacon frame is sent, corresponding to the channel identifier;
   when the AP sends the beacon frame on two or more first subchannels, the method further comprises:
   determining a first channel identifier, wherein the first channel identifier is a channel identifier of a first subchannel that is used to receive the beacon frame,
   determining a second remaining time according to a sending time, at which the beacon frame is sent, corresponding to the first channel identifier, wherein the second remaining time is a remaining time for sending the beacon frame on the first subchannel corresponding to the first channel identifier;
   starting a timer;
   when a timing time of the timer is equal to the second remaining time, receiving the beacon frame according to the first channel identifier, wherein the beacon frame comprises the access information required for accessing the AP.

14. The method according to claim 13, wherein the determining a first channel identifier comprises:
   determining, according to the beacon indication frame, a channel identifier corresponding to a sending time that is the earliest in sending times for sending the beacon frame, as the first channel identifier; or
   determining, according to a radio frequency capability of a receiver of the STA, a channel identifier of a first subchannel supported by the STA, as the first channel identifier.

15. The method according to claim 13, wherein the acquiring, according to the beacon indication frame, access information required for accessing the AP comprises:
   sending a probe request frame to the AP according to the beacon indication frame; and
   receiving a probe response frame sent by the AP, wherein the probe response frame comprises the access information required for accessing the AP.

16. The method according to claim 13, after the accessing the AP according to the access information required for accessing the AP, further comprising:
   receiving the beacon indication frame on the subchannel, wherein the beacon indication frame further comprises event notification information; and
   when the event notification information is used to indicate that system information of the WLAN system does not change, receiving the beacon frame according to the beacon indication frame.

17. The method according to claim 16, further comprising:
   starting a timer when the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

18. The method according to claim 13, after the accessing the AP according to the access information required for accessing the AP, further comprising:

receiving the beacon indication frame on the subchannel;

starting a timer when the beacon indication frame comprises event notification information, wherein the event notification information is used to indicate to-be-changed system information and a remaining time before the to-be-changed system information changes;

when a timing time of the timer is equal to the remaining time before the to-be-changed system information changes, receiving a new beacon indication frame on the subchannel; and acquiring a new beacon frame according to the new beacon indication frame, and updating the to-be-changed system information according to the new beacon frame.

* * * * *